United States Patent
Scrivani

(10) Patent No.: US 11,325,731 B2
(45) Date of Patent: May 10, 2022

(54) METHOD AND APPARATUS FOR WRAPPING HYGROSCOPIC FOOD PRODUCTS

(71) Applicant: Azionaria Costruzioni Macchine Automatiche A.C.M.A. S.p.A., Bologna (IT)

(72) Inventor: Massimo Scrivani, Casteggio (IT)

(73) Assignee: AZIONARIA CONSTRUZIONI MACCHINE AUTOMATICHE A.C.M.A. S.P.A.

( * ) Notice: Subject to any disclaimer, the term of this patent is extended or adjusted under 35 U.S.C. 154(b) by 44 days.

(21) Appl. No.: 16/486,407

(22) PCT Filed: Feb. 27, 2018

(86) PCT No.: PCT/IB2018/051244
§ 371 (c)(1),
(2) Date: Aug. 15, 2019

(87) PCT Pub. No.: WO2018/158689
PCT Pub. Date: Sep. 7, 2018

(65) Prior Publication Data
US 2020/0024016 A1    Jan. 23, 2020

(30) Foreign Application Priority Data
Feb. 28, 2017 (IT) .................. 102017000022526

(51) Int. Cl.
*B65B 11/40* (2006.01)
*B65B 25/00* (2006.01)
(Continued)

(52) U.S. Cl.
CPC ............ *B65B 11/40* (2013.01); *B65B 25/005* (2013.01); *B29C 66/83513* (2013.01);
(Continued)

(58) Field of Classification Search
CPC ..... B65B 25/005; B65B 49/12; B65B 51/306; B65B 11/40; B65B 31/06; B65B 31/04;
(Continued)

(56) References Cited

U.S. PATENT DOCUMENTS 3,360,382 A * 12/1967 Miller ................... B65B 25/067
426/316
4,249,364 A * 2/1981 Kawasaki ............. B65B 59/001
53/550

(Continued)

FOREIGN PATENT DOCUMENTS

CH      337120 A      3/1959
CN     1181045 A      5/1998
(Continued)

OTHER PUBLICATIONS

International Search Report and Written Opinion dated May 4, 2018 for counterpart International Patent Application No. PCT/IB2018/051244.

(Continued)

*Primary Examiner* — Thomas M Wittenschlaeger
(74) *Attorney, Agent, or Firm* — Shuttleworth & Ingersoll, PLC; Timothy J. Klima

(57) ABSTRACT

A method for wrapping hygroscopic products includes feeding a succession of products and wrapping each product in wrapping material to define a wrapper for the product, The wrapping includes 1) folding a sheet of wrapping material into a U-shape around a respective product and sealing to each other at least two edges of the sheet of wrapping material along a first, longitudinal sealing line defining a tubular body in which the product is disposed and having a first and a second open end; 2) sealing two portions of the tubular body along second and third sealing lines transverse to the first longitudinal sealing line, thereby enclosing the product in the wrapper; and 3) creating a vacuum in the (Continued)

tubular body before the sealing the portions of the tubular body along at least one between the second and the third sealing lines.

3 Claims, 4 Drawing Sheets

(51) Int. Cl.
   *B29C 65/00*   (2006.01)
   *B65B 31/06*   (2006.01)
   *B65B 49/12*   (2006.01)
   *B65B 51/30*   (2006.01)
(52) U.S. Cl.
   CPC ............... *B65B 31/06* (2013.01); *B65B 49/12* (2013.01); *B65B 51/306* (2013.01)
(58) Field of Classification Search
   CPC ........... B65B 31/043; B65B 1/26; B65B 9/06; B29C 66/83513
   See application file for complete search history.

(56) References Cited

U.S. PATENT DOCUMENTS

| | | | | |
|---|---|---|---|---|
| 5,697,203 A | * | 12/1997 | Niwa | B65B 25/001 |
| | | | | 53/510 |
| 6,470,652 B1 | * | 10/2002 | Piron | B65B 31/04 |
| | | | | 53/511 |
| 7,257,936 B2 | * | 8/2007 | Salicini | B65B 11/32 |
| | | | | 53/212 |
| 10,189,622 B2 | * | 1/2019 | Scrivani | B65B 29/02 |
| 10,807,747 B2 | * | 10/2020 | Spatafora | B65B 25/005 |
| 2004/0037927 A1 | * | 2/2004 | Liempd Van | B65D 75/06 |
| | | | | 426/106 |
| 2010/0086652 A1 | * | 4/2010 | Mansuino | B65D 75/10 |
| | | | | 426/122 |
| 2014/0083055 A1 | * | 3/2014 | Rodrigues | B65B 51/146 |
| | | | | 53/465 |
| 2015/0329228 A1 | * | 11/2015 | Spatafora | B65B 11/32 |
| | | | | 53/450 |
| 2016/0236842 A1 | * | 8/2016 | Scrivani | B65D 75/04 |
| 2018/0255826 A1 | * | 9/2018 | Persson | B29C 66/1122 |

FOREIGN PATENT DOCUMENTS

| | | | | |
|---|---|---|---|---|
| CN | 204078192 U | | 1/2015 | |
| DE | 1094657 B | * | 12/1960 | ............ B65B 31/06 |
| WO | 2014097235 A2 | | 6/2014 | |
| WO | 2015056240 A1 | | 4/2015 | |

OTHER PUBLICATIONS

Chinese Office Action dated Aug. 19, 2019 from counterpart Chinese Patent Application No. 201880012657.6.

* cited by examiner

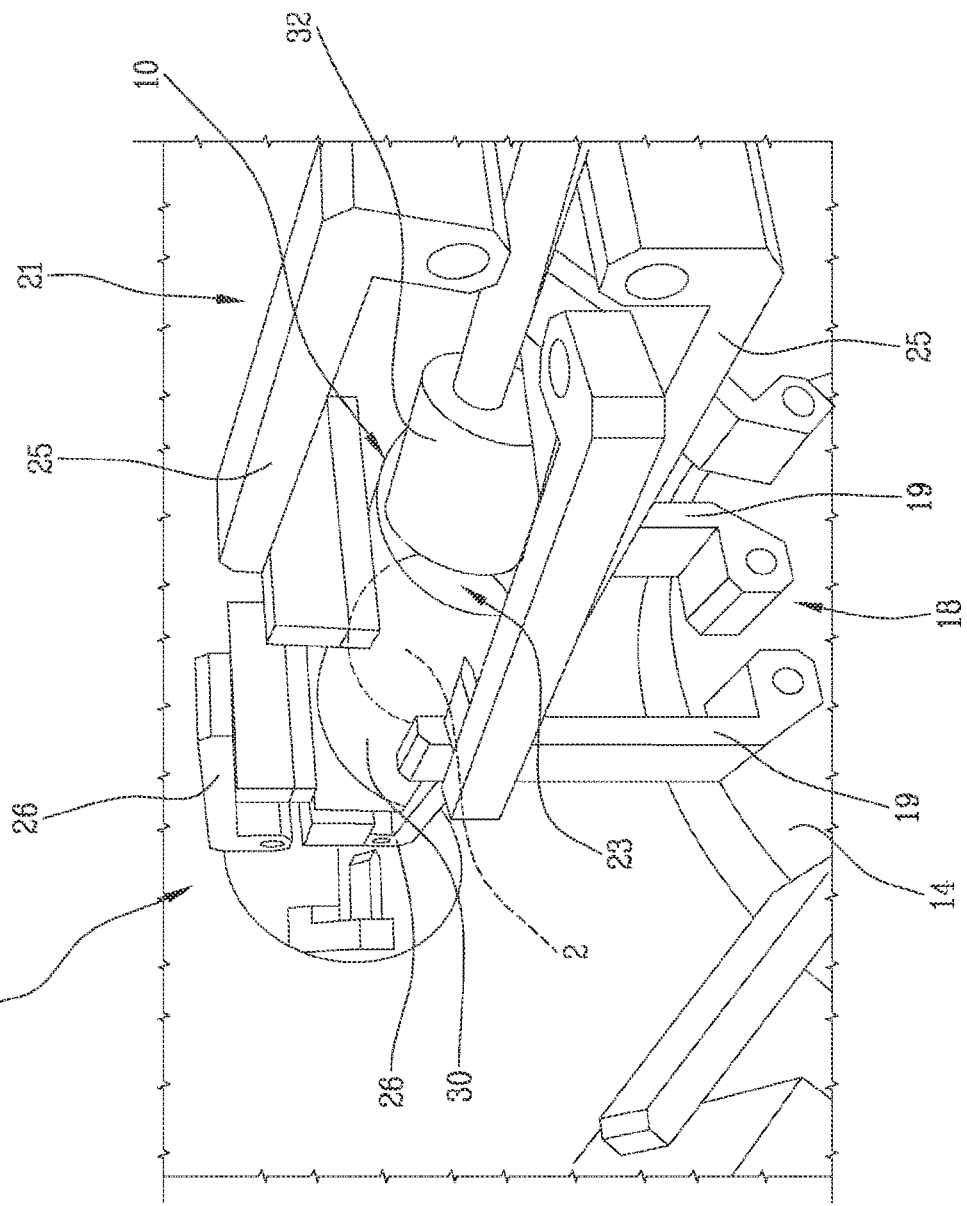

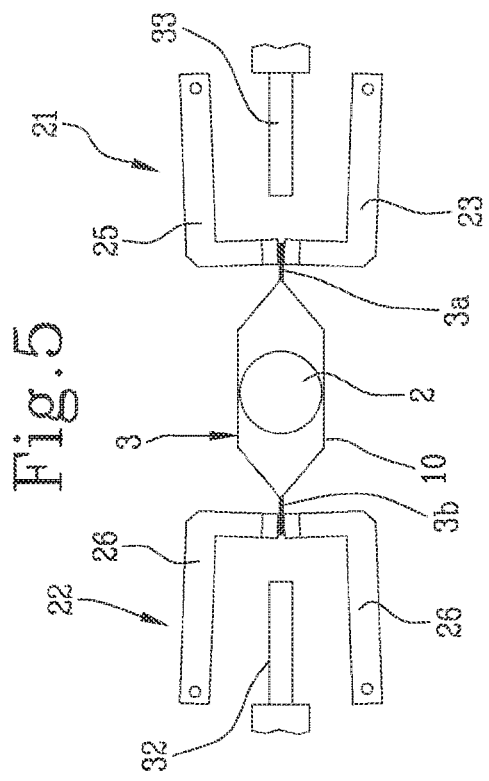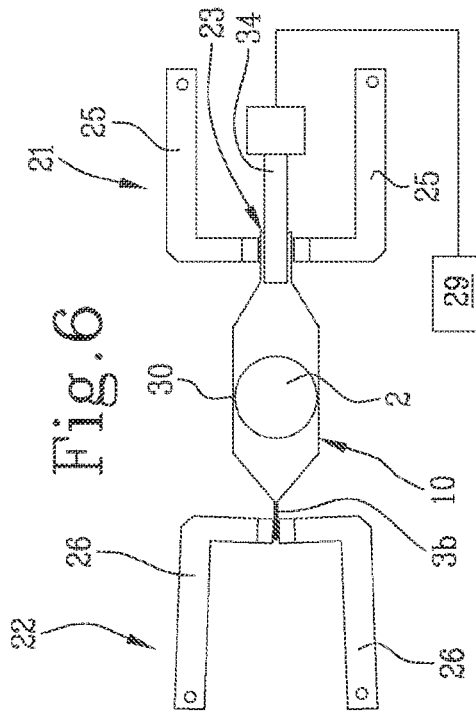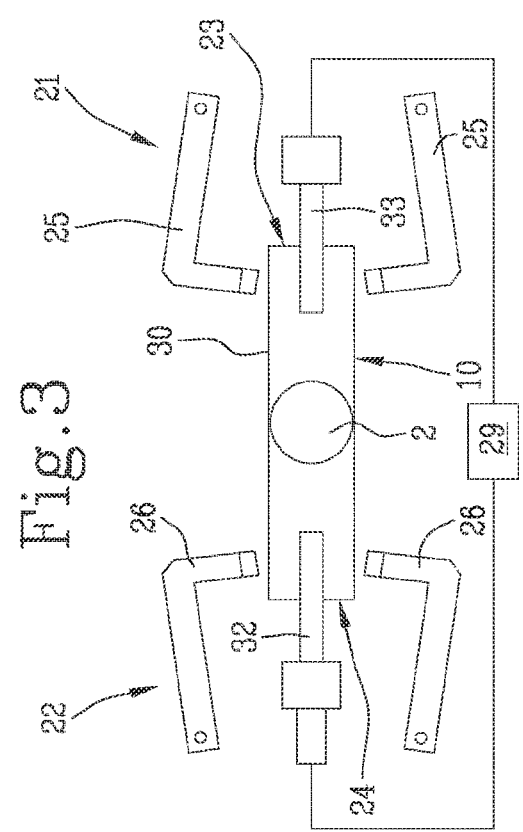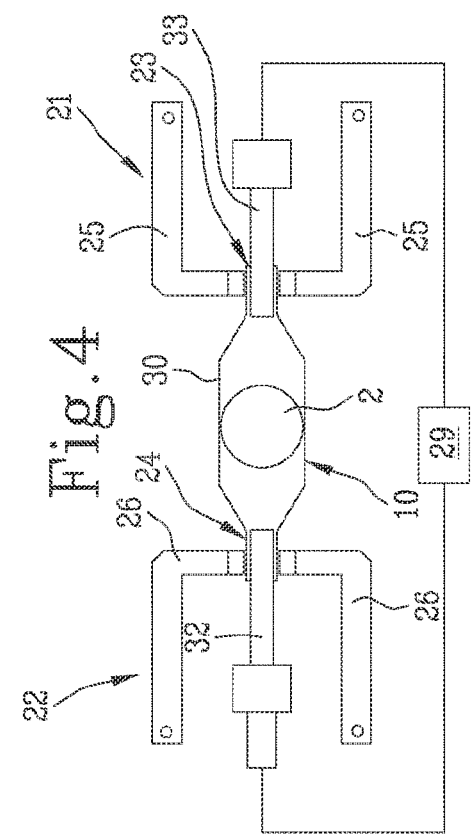

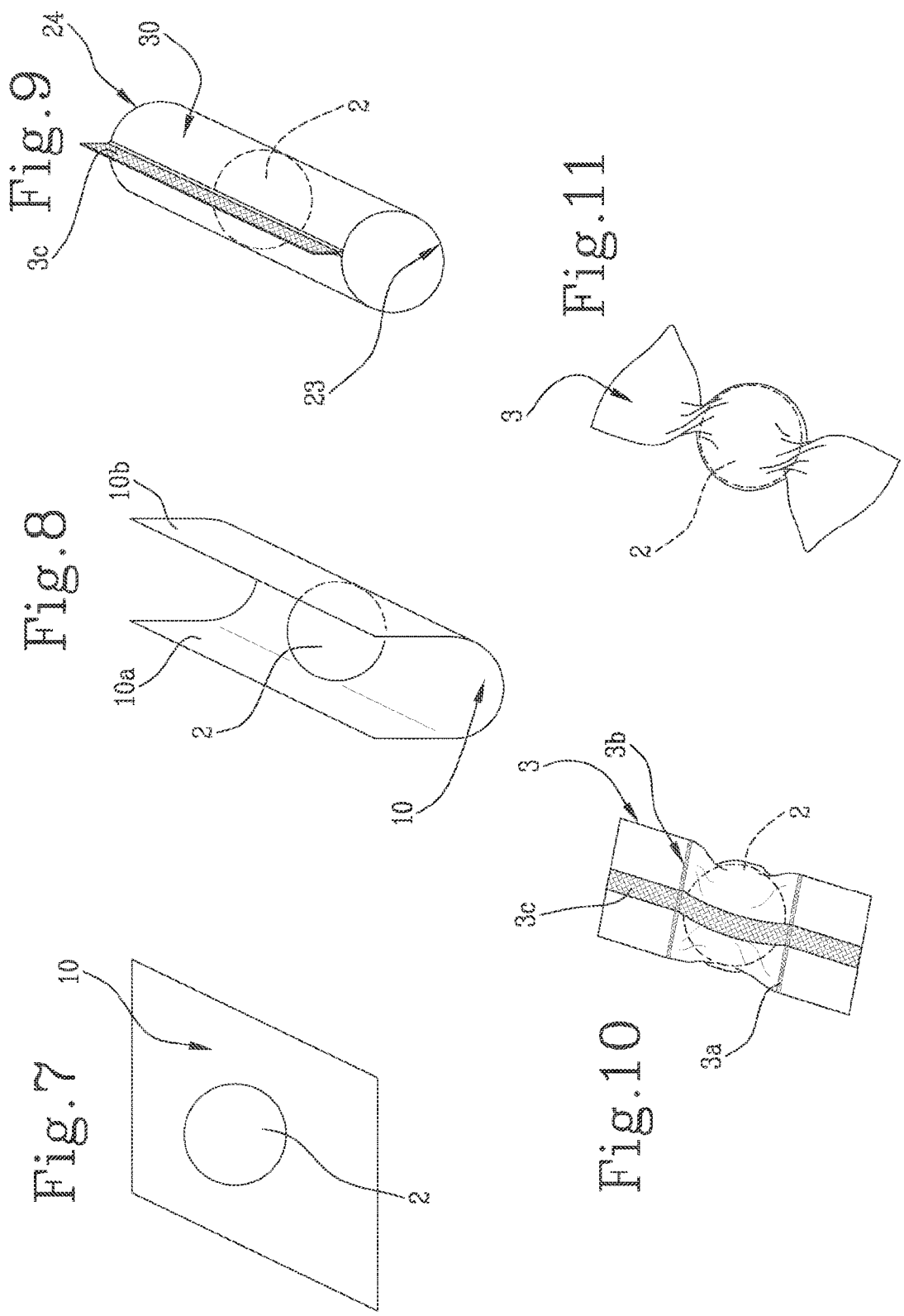

METHOD AND APPARATUS FOR WRAPPING HYGROSCOPIC FOOD PRODUCTS

This application is the National Phase of International Application PCT/IB2018/051244 filed Feb. 27, 2018 which designated the U.S.

This application claims priority to Italian Patent Application No. 102017000022526 filed Feb. 28, 2017, which application is incorporated by reference herein.

TECHNICAL FIELD

This invention relates to a machine for wrapping hygroscopic food products.

More specifically, the invention can be applied in particular to the wrapping of confectionery products such as, for instance, sweets, chocolates and the like, to which this specification will hereinafter refer but without losing in generality.

BACKGROUND ART

It is known that food products which contain hygroscopic substances undergo a natural deterioration process which may also be influenced by the chemical interaction of the food products with their storage environment: humidity, for example, accelerates the deterioration process of a food product.

DISCLOSURE OF THE INVENTION

In order to extend the shelf life of hygroscopic food products as much as possible, the need was felt to provide a method for wrapping hygroscopic products comprising a step of feeding a succession of products and a step of packaging each product of the succession in a respective sheet of wrapping material.

The wrapping step involves wrapping a product at least partly in a sheet of wrapping material, specifically by folding a sheet of wrapping material into a U shape around the respective product and sealing to each other at least two edges of the sheet of wrapping material to define a tubular body in which the product is disposed and which has a first and a second open end.

The wrapping step involves sealing to each other the edges of the sheet of wrapping material at the first and second open ends of the tubular body, thereby closing the tubular body.

The wrapping step comprises a step of creating a vacuum in the tubular body which continues until the tubular body is completely sealed so as to extract air from the tubular body before completely sealing the product inside the tubular body defined by the wrapping material.

Advantageously, this method allows considerably limiting the amount of air present in the wrapper, thereby increasing the shelf life of the product.

BRIEF DESCRIPTION OF DRAWINGS

Further features and advantages of this invention are more apparent in the description below, with reference to a preferred, non-limiting embodiment of a machine as illustrated in the accompanying drawings, in which:

FIG. 2 is a scaled-up perspective view of a detail of the machine of FIG. 1;

FIGS. 3 to 6 are schematic side views of a detail of the machine of FIG. 1 during different operating steps;

FIGS. 7 to 11 illustrate the steps in the wrapping of a product with the respective sheet of wrapping material.

DETAILED DESCRIPTION OF PREFERRED EMBODIMENTS OF THE INVENTION

Figure 1:
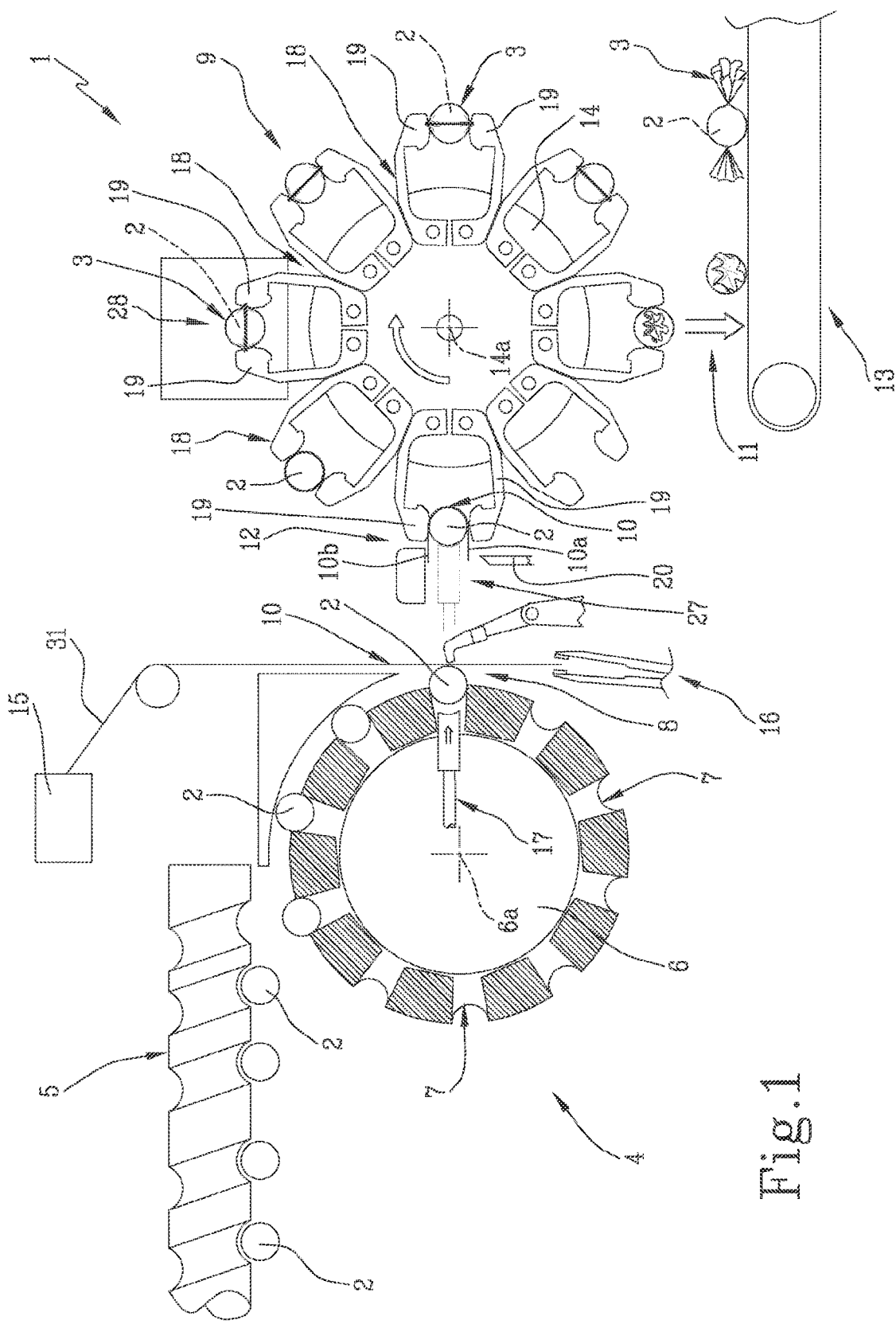
FIG. 1 is a schematic front view of a machine for wrapping hygroscopic food products according to this invention.

With reference to FIG. 1, the numeral 1 denotes in its entirety a machine for wrapping food products 2 in a respective wrapper 3.

For example, the food products 2 may be confectionery products such as chocolates and sweets or pods containing aromatic substances such as coffee, tea or infusions.

The style of the wrapper 3 for the product 2 may be for example "single-end twist", "double-end twist", "boero" "bunch" "pillow pack".

The products 2 feeding out of the machine 1 according to this invention are each sealed in their wrapper 3 whatever the style of the wrapper 3.

Each product 2 is sealed in a respective sheet 10 of wrapping material defining the wrapper 3 through the steps illustrated in FIGS. 7 to 11.

The sheet 10 of wrapping material is folded at least partly around the product 2, defining two free edges 10a and 10b extending outwards relative to the product 2.

More specifically, the sheet 10 of wrapping material is folded into a U shape around the product 2.

The free edges 10a and 10b of the sheet 10 of wrapping material are sealed to each other, defining a first, longitudinal sealing line 3c.

In the jargon of the trade, the first, longitudinal sealing line 3c is known as "fin".

The first, longitudinal sealing line 3c extends along the longitudinal direction of extension of the wrapper 3.

The sheet 10 of wrapping material having the first, longitudinal sealing line 3c defines a tubular body 30.

The product 2 is disposed inside the tubular body 30.

In order to completely seal the product 2 inside the tubular body 30, a second sealing line 3a and third sealing line 3b, both transverse, join respective portions of the tubular body 30.

The second and third sealing lines 3a and 3b extend along a direction transverse to the longitudinal direction of extension of the first sealing line 3c.

Once the tubular body 2 has been completely sealed, the wrapper can shaped into the required style.

In short, the wrapper 3 in which each product 2 is sealed has a first sealing line 3c extending longitudinally and at least a second sealing line 3a and a third sealing line 3b extending transversely.

The machine 1 for wrapping the product 2 in the respective wrapper 3 comprises a feed device 4 for feeding a succession of products 2 to be sealed individually, each in its own wrapper 3.

The machine 1 comprises a wrapping device 9 configured to seal each product 2 in a respective sheet 10 of wrapping material defining the wrapper 3.

The feed device 4 conveys the ordered succession of products 2 towards a feed station 8 of the wrapping device 9.

At a loading station 12, the wrapping device 9 is configured to withdraw each product 2 and a respective sheet 10 of wrapping material.

The feed device 4 comprises transfer means 17 for transferring each product 2 and a respective sheet 10 of wrapping material from the feed station 8 to the loading station 12 of the wrapping device 9.

The machine 1 comprises feed means 15 for feeding a continuous web 31 of wrapping material towards the loading station 12 of the wrapping device 9.

As it moves towards the loading station 12, the continuous web 31 is divided into sheets 10 of wrapping material.

A withdrawing device 16 is configured to withdraw a sheet 10 of wrapping material from the continuous web 31 during transfer of the product 2 from the feed station 8 to the loading station 12 of the wrapping device 9.

At an unloading station 11, the wrapping device 9 is configured to deliver the product 2, sealed in the respective wrapper 3, defined by the sheet 10 of wrapping material.

A conveyor line 13 receives the sealed products 2 feeding out of the unloading station 11 and conveys them towards further processing stations.

In this embodiment, the feed device 4 for feeding the products 2 comprises conveying means 5 for conveying the products 2 towards a means 6 for sorting and spacing the products 2.

The conveying means 5 for conveying the products 2 are in the form of a screw feeder 5 which rotates about its main axis of rotation.

The sorting and spacing means 6 is in the form of a conveyor 6 which rotates about its main axis 6a and which is provided with a plurality of recesses 7 for receiving the products 2 and distributed uniformly along its peripheral surface.

The screw feeder 5 feeds the products 2 into the recesses 7 of the conveyor 6 which, as it rotates about its main axis 6a, carries the products 2 towards the feed station 8 of the wrapping device 9.

In the embodiment illustrated, the wrapping device 9 comprises at least one conveying roller 14 which rotates about its axis of rotation 14a and which conveys each product 2, together with the respective sheet 10 of wrapping material.

The conveying roller 14 comprises a plurality of retaining elements 18 each of which holds a product 2, coupled with the sheet 10 of wrapping material, and which are disposed at a predetermined spacing from each other.

Each retaining element 18 comprises a pair of jaws 19 to grip a product 2 together with the respective sheet 10 of wrapping material.

More specifically, each retaining element 18 uses the jaws 19 to grip the product 2 and acts on the lateral surface of the respective product 2.

Each retaining element 18 is configured to receive each product 2, together with the respective sheet 10 of wrapping material, at the loading station 12.

More specifically, using the pair of jaws 19, each retaining element 18 grips a respective product 2 together with the respective sheet 10 of wrapping material, which is folded into a U shape around the product 2 with the lateral edges 10a and 10b protruding outwards from the conveyor roller 14.

More specifically, at the loading station 12, one portion of the sheet 10 of wrapping material is held against the product 2 by the retaining element 18 using the pair of jaws 19 and another portion is left to protrude radially outwards from the conveyor roller 14, defining the edges 10a and 10b of the sheet 10 of wrapping material.

The wrapping device 9 comprises a first sealing station 27 where the first longitudinal sealing line 3c of the wrapper 3 is made.

The wrapping device 9 comprises a second sealing station 28 where the second and third, transverse sealing lines 3a and 3b of the wrapper 3 are made.

Alternatively, in an embodiment not illustrated, the wrapping device 9 comprises a sealing station where the second sealing line 3a of the wrapper 3 is made and a sealing station where the third sealing line 3b of the wrapper 3 is made.

Each retaining element 18 is configured to grip and hold the respective product 2, together with the sheet 10 of wrapping material, as it moves from the loading station 12 to the unloading station 11, passing by way of the first and second sealing stations 27 and 28.

Downstream of the second sealing station 28, the wrapping device 9 comprises folding means, not illustrated, configured to shape the wrapper 3, with the product 2 sealed inside it, into the required wrapping style.

At the first sealing station 27, the wrapping device 9 comprises first sealing means 20 for sealing the protruding edges 10a and 10b of the sheet 10 of wrapping material at least partly surrounding the respective product 2, thereby making the first longitudinal sealing line 3c.

Joining the protruding edges 10a and 10b of the sheet 10 defines the tubular body 30 in which the product 2 is disposed and whose first and second, opposite ends 23 and 24 are open.

At the second sealing station 28, the wrapping device 9 comprises second sealing means 21 and third sealing means 22 for sealing respective portions of the tubular body 30, to make the second and third transverse sealing lines 3a and 3b.

The second and third transverse sealing lines 3a and 3b of the tubular body 30 close the open ends 23, 24 of the tubular body 30.

The second sealing means 21 comprise a pair of jaw-like elements 25.

The jaw-like elements 25 are configured to pass from a non-operating configuration to an operating configuration, where they engage a respective portion of the tubular body 30, and vice versa.

The jaw-like elements 25 act as sealing means 21 whose pressure and sealing action depend on the properties of the sheet 10 of wrapping material and/or on whether or not there is hot-melt or cold glue on it.

The third sealing means 22 comprise a pair of jaw-like elements 26.

The jaw-like elements 26 are configured to pass from a non-operating configuration to an operating configuration, where they engage a respective portion of the tubular body 30, and vice versa.

The jaw-like elements 26 act as sealing means whose pressure and sealing action depend on the properties of the sheet 10 of wrapping material and/or on whether or not there is hot-melt or cold glue on it.

According to this invention, at the second sealing station 28, the wrapping device 9 comprises suction means 29 configured to create a vacuum inside the tubular body 30.

The suction means 29 are configured to be inserted at least partly into at least one of the open ends 23, 24 of the tubular body 30.

The suction means 29 comprise at least one suction pipe 32, which is movable from a disengaged position to an engaged position in the first open end 23 of the tubular body 30, and a second suction pipe 33, which is movable from a disengaged position to an engaged position in the second open end 23 of the tubular body 30.

Movement from the engaged position to the disengaged position and vice versa is accomplished by relative translation between the first and the second suction pipe 32 and 33 and the tubular body 30 held in place by the retaining elements 18, as schematically illustrated in FIG. 2.

The second sealing means 27 are configured to move from the non-operating configuration to the operating configuration during movement of the first suction pipe 32 from the engaged position to the disengaged position in the first open end 23 of the tubular body 30.

At the operating position of the second sealing means 21, the first suction pipe 32 is disengaged from the tubular body 30.

In other words, when it is at the disengaged position, the first suction pipe 32 is disposed outside the tubular body 30.

The jaw-like elements 25 of the sealing means 21 apply the pressing and/or sealing action when the first suction pipe 32 is at the disengaged position, that is, outside the tubular body 30.

The third sealing means 22 are configured to move from the non-operating configuration to the operating configuration during movement of the second suction pipe 33 from the engaged position to the disengaged position in the second open end 24 of the tubular body 30.

At the operating position of the third sealing means 22, the second suction pipe 33 is disengaged from the tubular body 30.

In other words, when it is at the disengaged position, the second suction pipe 33 is disposed outside the tubular body 30.

The jaw-like elements 26 of the sealing means 22 apply the pressing and/or sealing action when the second suction pipe 33 is at the disengaged position, that is, outside the tubular body 30.

In use, with reference to FIGS. 3 to 6, which illustrate the steps of making the second and third, transverse sealing lines 3a and 3b, the first and the second suction pipe 32 and 33 pass from the disengaged position to the engaged position by moving at least partly into the respective first and second open end 23, 24 of the tubular body.

Once the first and the second suction pipe 32 and 33 have moved at least partly into the first and second open end 23, 24, the suction means 29 create a vacuum inside the tubular body 30.

The suction means 29 are configured to create the vacuum through both the first and the second pipe 32 and 33 or through only one between the first and the second pipe 32 and 33.

Creating a vacuum in the tubular body 30 causes the sheet 10 of wrapping material to move into contact with at least part of the product 2 and with at least part of the first and the second pipe 32 and 33 to define the tubular body 30.

In this regard, it should be noted that the first and the second suction pipe 32 and 33 are shaped to move into the opening of the first and the second end 23 and 24 of the tubular body 30, thus limiting the size of the gap between the first and the second pipe 32 and 33 the first and second open end 23, 24, thereby helping to create the vacuum inside the tubular body 30.

More specifically, the transverse dimension of the first and the second suction pipe 32 and 33 is nearly the same in size as the transverse cross section of the respective first and second open end 23 and 24 so that after the vacuum has been created in the tubular body 30, the tubular body 30 comes into contact with the respective pipe 32 and 33 along its extension.

This makes it easier to seal the tubular body 30 because the second and third sealing means 21 and 22 can operate on the full transverse extension of the tubular body 30.

The second and third sealing means 21 and 22 pass from the non-operating configuration to the operating configuration and, at the same time, the first and second pipes 32 and 33 pass from the engaged position to the disengaged position.

The operating configuration of the second and third sealing means 21 and 22 is reached when the first and the second pipe 32 and 33 reach the disengaged position.

At this point, once the second and third sealing means 21 and 22 have made the second and the third, transverse sealing line 3a and 3b, the product 2 is sealed inside its wrapper 3 defined by the sealed sheet 10 of wrapping material.

With reference to the alternative embodiment of FIG. 6, the suction means 29 comprise a single suction pipe 34 movable from a disengaged position to an engaged position in the respective first open end 23 of the tubular body 30.

In this embodiment, the third sealing means 22 are configured to move from the non-operating configuration to the operating configuration before suction means 29 create the vacuum in the tubular body 30.

Once the third sealing means 22 are disposed in the operating configuration to make the third, transverse sealing line 3b, the suction pipe 34 moves to the corresponding engaged position, so that the suction means 29 create the vacuum in the tubular body 30 which is closed at the second end 24 along the third, transverse sealing line 3b.

At this point, the second sealing means 21 pass from the non-operating configuration to the operating configuration and, at the same time, the pipe 34 is pulled out of the tubular body 30 to pass from the engaged position to the disengaged position.

The operating configuration of the second sealing means 21 is reached when the pipe 34 reaches the disengaged position, that is, outside the tubular body 30.

When the second, transverse sealing line 3a of the tubular body 30 has been made. the product 2 is sealed inside its wrapper 3 defined by the sealed sheet 10 of wrapping material.

The invention claimed is:

1. A method for wrapping hygroscopic products comprising the following steps:
feeding a succession of products;
providing a wrapping device for wrapping the products, the wrapping device including a conveying roller rotatable about an axis of rotation to receive and convey the products in the succession around the axis, and wrapping with the wrapping device each product of the succession in a respective sheet of wrapping material defining a wrapper for the product;
the wrapping step comprising folding the respective sheet of wrapping material around at least part of a respective product, and sealing to each other at least two edges of the respective sheet of wrapping material along a first, longitudinal sealing line, thereby defining a tubular body in which the product is disposed and having a first open end and a second open end;
the wrapping step further comprising, at a second sealing station, sealing portions of the tubular body at the first open end and the second open end respectively along a second sealing line and a third sealing line transverse to the first longitudinal sealing line, thereby enclosing the product in the wrapper;

providing at the second sealing station that the wrapping device comprises a second sealing device and third sealing device, each including a pair of jaws configured to move between an open non-operating configuration to a closed operating configuration clamping the tubular body for heat sealing respective portions of the tubular body, to make the second and third sealing lines;

the wrapping step further comprising a step of creating a vacuum in the tubular body following the step of sealing the portion of the tubular body along the third sealing line and preceding the step of sealing the portion of the tubular body along the second sealing line;

wherein the step of creating the vacuum comprises a step of extracting air through both of the first and second open ends of the tubular body.

2. A machine for wrapping hygroscopic products, comprising
- a feed device for feeding a succession of products to be sealed individually, each of the products in its own wrapper;
- a wrapping device configured to seal each product in a respective sheet of wrapping material defining the wrapper, the wrapping device including a conveying roller rotatable about an axis of rotation to receive and convey the products in the succession around the axis;
- the wrapping device comprising a loading station, the wrapping device being configured to withdraw each product and the respective sheet of wrapping material wrapped around at least part of the product at the loading station;
- the wrapping device comprising a first sealing station where a first longitudinal sealing line of the wrapper is made and a second sealing station where second and third transverse sealing lines of the wrapper are made;
- at the second sealing station, the wrapping device comprising a second sealing device and third sealing device, each including a pair of jaws configured to move between an open non-operating configuration to a closed operating configuration clamping the tubular body for heat sealing respective portions of the tubular body, to make the second and third transverse sealing lines; wherein, at the second sealing station, the wrapping device comprises a suction device configured to create a vacuum inside the tubular body;
- the suction device comprising a first suction pipe, which is movable from a disengaged position to an engaged position in a first open end of the tubular body, and a second suction pipe, which is movable from a disengaged position to an engaged position in a second open end of the tubular body;
- wherein the suction device is configured to create the vacuum through both the first and the second suction pipes.

3. The machine according to claim 2,
wherein at a same time as the movement of the pair of jaws between the open non-operating configuration to the closed operating configuration, the first and second suction pipes are configured to move from an engaged position to a disengaged position.

\* \* \* \* \*